United States Patent [19]

Tsuzuku et al.

[11] Patent Number: 5,606,942
[45] Date of Patent: Mar. 4, 1997

[54] VALVE OPERATING SYSTEM FOR MULTI-VALVE ENGINE

[75] Inventors: Hiroyuki Tsuzuku; Tetsushi Saito; Naoki Tsuchida, all of Iwata, Japan

[73] Assignee: Yamaha Hatsudoki Kabushiki Kaisha, Iwata, Japan

[21] Appl. No.: 474,260

[22] Filed: Jun. 7, 1995

[30] Foreign Application Priority Data

Jun. 17, 1994 [JP] Japan ................................ 6-136032

[51] Int. Cl.⁶ .............................. F01L 13/00; F01L 1/12
[52] U.S. Cl. .................... 123/90.16; 123/90.17; 123/90.27; 123/90.28; 123/90.6
[58] Field of Search ........................... 123/90.27, 90.28, 123/90.48, 90.6, 90.15, 90.16, 90.17

[56] References Cited

U.S. PATENT DOCUMENTS

| | | | |
|---|---|---|---|
| 4,438,737 | 3/1984 | Burandt | 123/90.17 |
| 4,538,559 | 9/1985 | Imamura et al. | 123/90.6 |
| 4,617,881 | 10/1986 | Aoi et al. | 123/90.27 |
| 4,621,597 | 11/1986 | Kawada et al. | 123/90.27 |
| 4,883,026 | 11/1989 | Mansfield et al. | 123/90.16 |
| 4,915,065 | 4/1990 | Yamada | 123/90.27 |
| 4,955,334 | 9/1990 | Kawamura | 123/90.11 |
| 4,969,427 | 11/1990 | Hamada | 123/90.27 |
| 4,974,560 | 12/1990 | King | 123/90.17 |
| 5,033,422 | 7/1991 | Kurisu et al. | 123/90.27 |
| 5,094,197 | 3/1992 | Rosa | 123/90.27 |
| 5,095,858 | 3/1992 | Ascari | 123/90.27 |
| 5,097,805 | 3/1992 | Uesugi et al. | 123/90.34 |
| 5,123,385 | 6/1992 | Sado et al. | 123/193.5 |
| 5,269,267 | 12/1993 | Beaumont | 123/90.16 |
| 5,309,872 | 5/1994 | Filippi et al. | 123/90.6 |
| 5,327,856 | 7/1994 | Schroeder et al. | 123/90.11 |

FOREIGN PATENT DOCUMENTS

| | | |
|---|---|---|
| 6528774 | 8/1975 | Australia . |
| 0333416 | 9/1989 | European Pat. Off. . |
| 0340834 | 11/1989 | European Pat. Off. . |
| 444562 | 9/1991 | European Pat. Off. . |
| 0453416 | 10/1991 | European Pat. Off. . |
| 601570 | 6/1994 | European Pat. Off. . |
| 1035893 | 9/1953 | France . |
| 2552820 | 4/1985 | France . |
| 2659388 | 9/1991 | France . |
| 843329 | 7/1949 | Germany . |
| 2809915 | 9/1979 | Germany . |
| 3609693 | 10/1986 | Germany . |
| 4121504 | 3/1992 | Germany . |
| 2275096 | 8/1994 | United Kingdom . |

OTHER PUBLICATIONS

European Search Report dated Nov. 15, 1995.
Patent Abstract of Japan, vol. 95, No. 0005, 16 May 1995 & JP–A–07 127403 (Einaga Hideo) 16 May 1995.

Primary Examiner—Weilun Lo
Attorney, Agent, or Firm—Knobbe, Martens, Olson & Bear LLP

[57] ABSTRACT

A number of embodiments of overhead cam internal combustion engines having multiple intake and exhaust valves. The valve actuating mechanism is such that the valves are opened at a non-symmetrical rate so as to minimize the clearance requirements at top dead center and also so as to minimize the overlap between the closing of the exhaust valve and the opening of the intake valve without decreasing volumetric efficiency. A number of embodiments having either direct or rocker arm actuation are disclosed.

13 Claims, 17 Drawing Sheets

5,606,942

VALVE OPERATING SYSTEM FOR MULTI-VALVE ENGINE

BACKGROUND OF THE INVENTION

This invention relates to a valve operating system for a multi-valve engine and more particularly to an improved valve actuating arrangement for such engines.

The use of multiple intake valves for each cylinder of an engine is well acknowledged as a way to increase the performance of the engine. It has been found that a larger number of smaller diameter valves can provide a greater flow area and less inertia than the use of single large valves. Thus, it is common with many engines, particularly high-performance engines, to use four valves per cylinder.

Generally, there are provided two intake valves on the intake side of the engine and two exhaust valves on the exhaust side for each cylinder. With this type of an arrangement, fairly large flow areas can be provided and engine power output increased for a given displacement for the reasons which have been noted above. The use of multiple valves for each cylinder of the engine, however, presents some problems.

As the number of valves is increased, there becomes an increasing problem in conjunction with the placement of the valves, the maintenance of low-combustion chamber volumes and low surface areas and the necessity to reduce the likelihood of interference between the valves and the piston. Thus, the valve size, number and placement has been generally a compromise between these factors.

It has also been acknowledged that performance can be further increased through the use of five valves per cylinder. With such an arrangement, three intake valves and two exhaust valves are provided for each cylinder. The general positioning of the intake valves is that there are two side intake valves that lie close to or actually extend over a plane containing the cylinder bore axis of the engine and which divides the intake side from the exhaust side. A third center intake valve is disposed between the side intake valves and further from the aforenoted dividing plane. The problems with maintaining small combustion chamber volumes to maintain high compression ratios, and low combustion chamber surface areas, to reduce the likelihood of quenching, are further aggravated when five valves per cylinder are employed.

As has been noted, it is frequently the practice to provide an arrangement wherein the intake valves in a five-valve arrangement extend over onto the exhaust side of the engine. As a result of this, the exhaust valves will have a smaller area than the side intake valves and then the total intake valve area. The use of smaller exhaust valves than intake valves is generally accepted. This is partially because there is a larger pressure difference on the exhaust side than the intake side and thus the exhaust charge may be discharged easier than the intake charge may be drawn into the combustion chamber. However, when the number and size of the intake valves is further increased through the use of three intake valves versus two exhaust valves, then an uneven flow through the combustion chamber may result.

It is, therefore, a principle object of this invention to provide an improved engine arrangement for a multi-valve engine and a valve actuating mechanism therefor wherein the flow through the combustion chamber is optimized.

When three intake valves are used for the engine, the side intake valves tend to promote a swirling motion that occurs about an axis that extends transversely to the axis of the cylinder bore. This action is normally called tumble. However, the center intake valve will create a motion which is in the opposite direction to the tumble generated by the side intake valves. This can tend to cause conflicting flow patterns and may at times reduce the turbulence in the combustion chamber under conditions when turbulence may be desirable. Therefore, it has been proposed to move the center intake valve closer to the side intake valves and to have its diameter being much smaller than the side intake valves. This gives rise to further flow problems in the combustion chamber and the necessity for controlling the flow in a way in addition to the size of the valves.

It is a further object of this invention to provide a valve actuating mechanism and valve arrangement for a multi-valve engine wherein maximum flow can occur with minimum obstruction.

It is a further object of this invention to provide a valve operating system for a multi-valve engine wherein the flow can be optimized.

Generally, the operating mechanism for the valves of an engine provides relatively symmetric opening and closing movement of the valves. That is, the mechanism which operates the valves, be it direct actuation or actuation through rocker arms, causes a valve lift that progressively increases up until the valve is fully opened and then closes the valve with the rates of opening and closing being substantially the same. This does not always provide maximum charging efficiency.

It is, therefore, a still further object of this invention to provide an improved arrangement for operating the valves of an engine so as to obtain maximum charging and discharging of the combustion chamber.

In addition to the factors noted above, there are times during the valve stroke when the piston is at top dead center and either the intake and/or exhaust valves may be open or partially open. When this occurs, it is necessary to either recess the valves or provide cavities in the head of the piston for clearance purposes. This is not only an expensive arrangement, but also increases the combustion chamber volume at top dead center and thus reduces the possible compression ratio. This decreases thermal efficiency.

It is, therefore, a still further object of this invention to provide an improved valve actuating mechanism for a multi-valve engine wherein clearances may be maintained and high compression ratios obtained without adversely effecting the flow pattern into the combustion chamber.

As an example, in order to improve high-speed charging performance, it is a normal practice to open the intake valve either at or before top dead center. When this is done, however, the pressure in the combustion chamber may be relatively high and exhaust gases can in fact backflow through the induction system. In addition, the clearance problems aforenoted may be existent. However, it has been the practice to embody such a valve timing in order to ensure good charging efficiency.

It is, therefore, a still further object of this invention to provide an improved valve actuating mechanism for the intake valves of an engine wherein the opening of the intake valves may be delayed until the time when charging efficiency can be improved without decreasing the total charge flow to the engine.

In a similar manner, it has also been the practice to maintain the exhaust valve in an open condition until after the piston has passed its top dead center position. This overlap between the opening of the intake valve and the closing of the exhaust valve can provide rough running under low-speed and low-load conditions. In addition, the valve placement must be such so that there is clearance between the heads of the valves when they are all open and also this requires added clearance in the combustion chamber between the head of the piston and the valves.

It is, therefore, a still further object of this invention to provide an improved valve actuating mechanism for an engine and particularly for the exhaust valves thereof.

One common way in which the valves of an overhead valve, overhead cam engine are operated is through the use of directly actuated thimble tappets. These thimble tappets are supported in bores within the cylinder and engage the stems of the valves or are connected thereto in some manner for opening and closing the valves upon rotation of the camshaft. Of course, the tappet must have sufficient surface area for good contact with the cam lobes and to reduce wear. However, this arrangement may at times result in the provision of tappet bodies that are not as large as desirable. However, for clearance purposes, the diameter of the tappets cannot be increased with conventional engines.

It is, therefore, a still further object of this invention to provide a valve actuating mechanism embodying thimble tappets wherein the thimble tappets may be made of a large diameter without adversely effecting clearances.

One way in which the effective diameter of the tappet may be increased is by offsetting it relative to the axis of rotation of the camshaft. However, if the tappet bodies are so offset, then the placement of the valves may also be adversely effected.

It is, therefore, a still further object of this invention to provide an improved cam and tappet arrangement for an engine wherein the tappets may be offset relative to the cams without changing the location of the valves.

Where the tappet bodies are offset from the camshaft, it may be desirable to also offset them relative to the valve stems. However, this may provide a bending load on the tappets which tend to cause them to cock in their supporting bores and causes high frictional loads and possible damage.

It is, therefore, a still further object of this invention to provide an improved cam tappet and valve arrangement wherein offsetting is possible without increasing loading and causing the likelihood of undesirable load conditions.

SUMMARY OF THE INVENTION

A first feature of this invention is adapted to be embodied in an internal combustion engine that is comprised of a cylinder block having a cylinder bore with a piston reciprocating therein and a cylinder head which closes the cylinder bore. The cylinder head has a surface which cooperates with the cylinder bore and the head of the piston to define a combustion chamber. The surface of the cylinder head defines a plurality of intake valve seats which lie generally on one side of the combustion chamber and a plurality of exhaust valve seats which lie generally on the other side of the combustion chamber. The valve seats of one of the pluralities define a substantially greater effective area than the valve seats of the other plurality. A plurality of intake valves and a plurality of exhaust valves are slidably supported within the cylinder head and cooperate with the intake valve seats and exhaust valve seats, respectively, for controlling the flow therethrough. Operating means are provided for operating the intake and exhaust valves for opening and closing them. This operating means is effective to cause non-symmetrical opening and closing of at least one of the sets of valves so that they open at a different rate than they close.

Another feature of the invention is adapted to be embodied in a valve operating system for an overhead cam internal combustion engine that is comprised of a cylinder head assembly which supports a poppet-type valve for reciprocation about a valve axis for controlling the flow through an associated valve seat in the cylinder head assembly. A thimble-type tappet is supported for reciprocation in the cylinder head assembly about a tappet axis which is parallel to the valve axis and which is associated with the stem of the valve for operating the valve. A camshaft having a cam lobe is supported by the cylinder head assembly for rotation about a camshaft axis. The cam lobe is asymmetric on its opening and closing sides. The camshaft axis is offset relative to the tappet axis.

A further feature of the invention is also adapted to be embodied in a valve operating system for an overhead camshaft internal combustion engine as set forth in the preceding paragraph. In accordance with this feature of the invention, the tappet axis is offset relative to the valve stem axis on the same side as the offsetting of the camshaft axis relative to the tappet axis.

DETAILED DESCRIPTION OF THE PREFERRED EMBODIMENTS OF THE INVENTION

Figure 1:
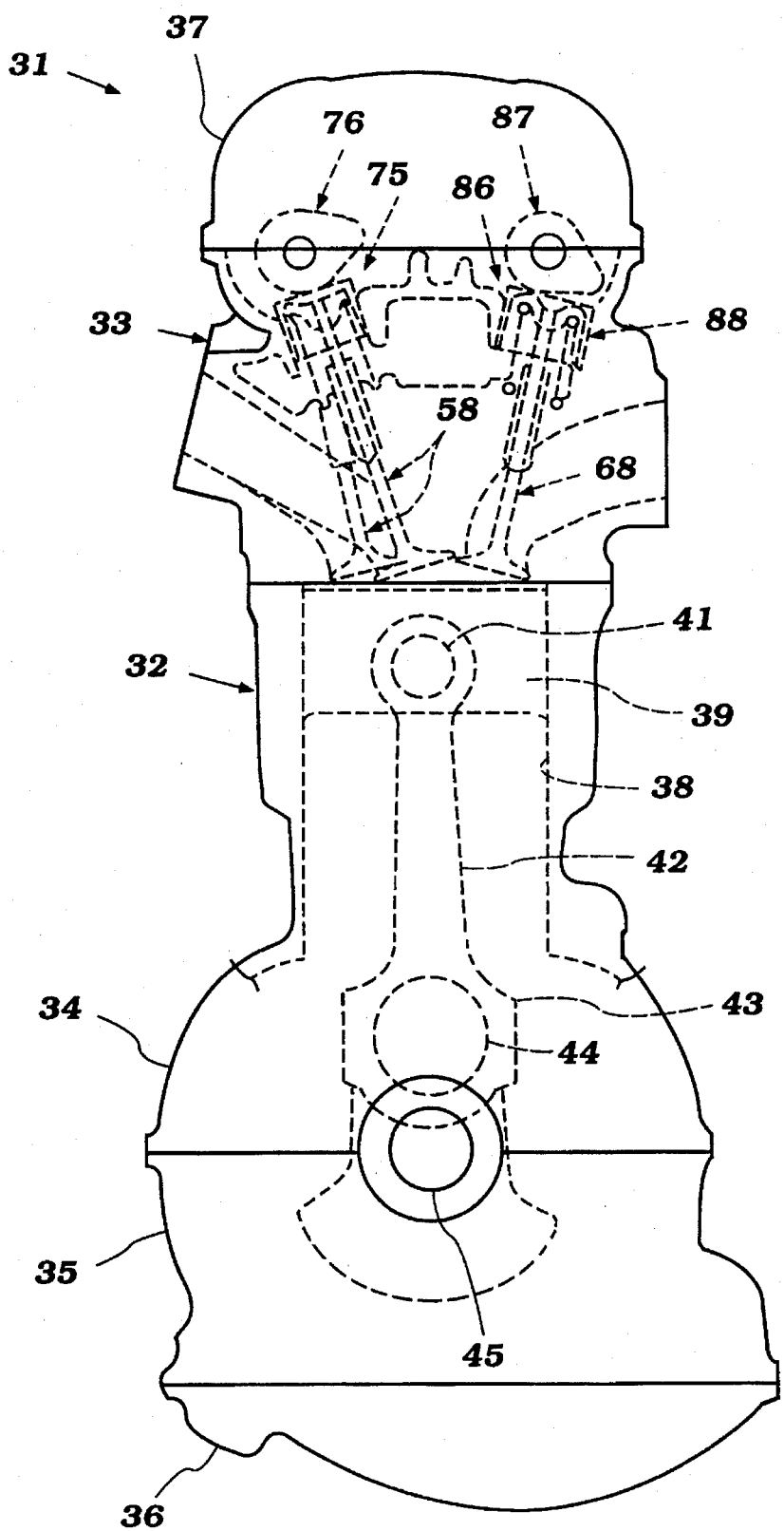
FIG. 1 is a front elevational view of an internal combustion engine constructed in accordance with an embodiment of the invention with the intake and exhaust manifolds removed.

Referring first to the embodiment of FIGS. 1–6 and initially to FIG. 1, an internal combustion engine constructed and operated in accordance with an embodiment of the invention is identified generally by the reference numeral 31. In the illustrated embodiment, the engine 31 is depicted as being of the in-line type and has multiple cylinders. Although the engine 31 has multiple cylinders, only one cylinder is shown in detail because it is believed readily apparent to those skilled in the art how the invention can be employed with multiple cylinder engines. In addition and for the same reasons, it will be readily apparent to those skilled in the art how the invention can be employed with engines having other cylinder configurations such as opposed, V-type, etc. engines.

The engine 31 is comprised of a cylinder block 32 which has a cylinder head assembly 33 affixed to its upper end in a known manner. The cylinder block 32 also has a skirt portion 34 to which a crankcase member 35 and lower cover 36 are affixed so as to form a crankcase chamber. A cam cover 37 is affixed to the cylinder head 33 and defines a cam chamber in which the overhead valve mechanism is positioned and this will be described now by particular reference to FIGS. 2–6 since the invention deals primarily with the valve mechanism for the engine.

However, in order to understand the relationship of the valve mechanism and cylinder head assembly 33 to the remainder of the engine, it will be noted in FIG. 1 that the cylinder block 32 is formed with cylinder bores 38 in which pistons 39 reciprocate in a known manner. The pistons 39 are connected by means of piston pins 41 to the upper or small ends of connecting rods 42. The lower or big ends of the connecting rods 42, indicated by the reference numeral 43 are split so as to be journaled on the throws 44 of a crankshaft 45 that is rotatably journaled in the crankcase chamber defined as aforenoted.

Referring now primarily to FIGS. 2–6, the cylinder head 33 is provided with a plurality of recesses 46 formed in its lower surface 47 that cooperate with the cylinder bores 38 and the heads of the pistons 39 to define the combustion chambers of the engine. At times, the recesses 46 will be referred to as the combustion chambers because at top dead center position, the main volume of the combustion chamber is formed by the recesses 46.

On substantially one side of a plane containing the axis of the cylinder bore, which axis is indicated by the reference numeral 48, the cylinder head 33 is provided with an induction passage, indicated generally by the reference numeral 49. The induction passage 49 is comprised of an inlet opening 51 formed in an outer surface 52 of the cylinder head assembly 33 to which a suitable induction system may be affixed in a well-known manner. The intake passage 49 extends from the opening 51 and branches into a pair of side portions 53 and a center portion 54. The portions 53 and 54 are separated in part from each other by internal cylinder head walls 55.

The side intake passages 53 terminate in side intake valve seats 56 which are formed in the cylinder head recess surface 46. These valve seats 56 may be formed from inserts which are pressed or cast into the cylinder head 33 in a known manner. These valve seats 56 have a diameter, indicated by the diameter $d_1$. This diameter $d_1$ is relatively large and as a result, the side intake valve seats 56 extend at least in part over the aforenoted plane containing the cylinder bore axis 48 onto the exhaust side of the combustion chamber 46. Also, the intake passage portions 53 and valve seats 56 are disposed so that the charge which enters the combustion chamber 46 from the induction system 49 will pass toward the cylinder wall 38 on the opposite side of the plane containing the axis 48 so as to generate a tumble action in the combustion chamber 46 in a clockwise direction about an axis that extends generally transversely to the cylinder bore axis 48.

Figure 3:
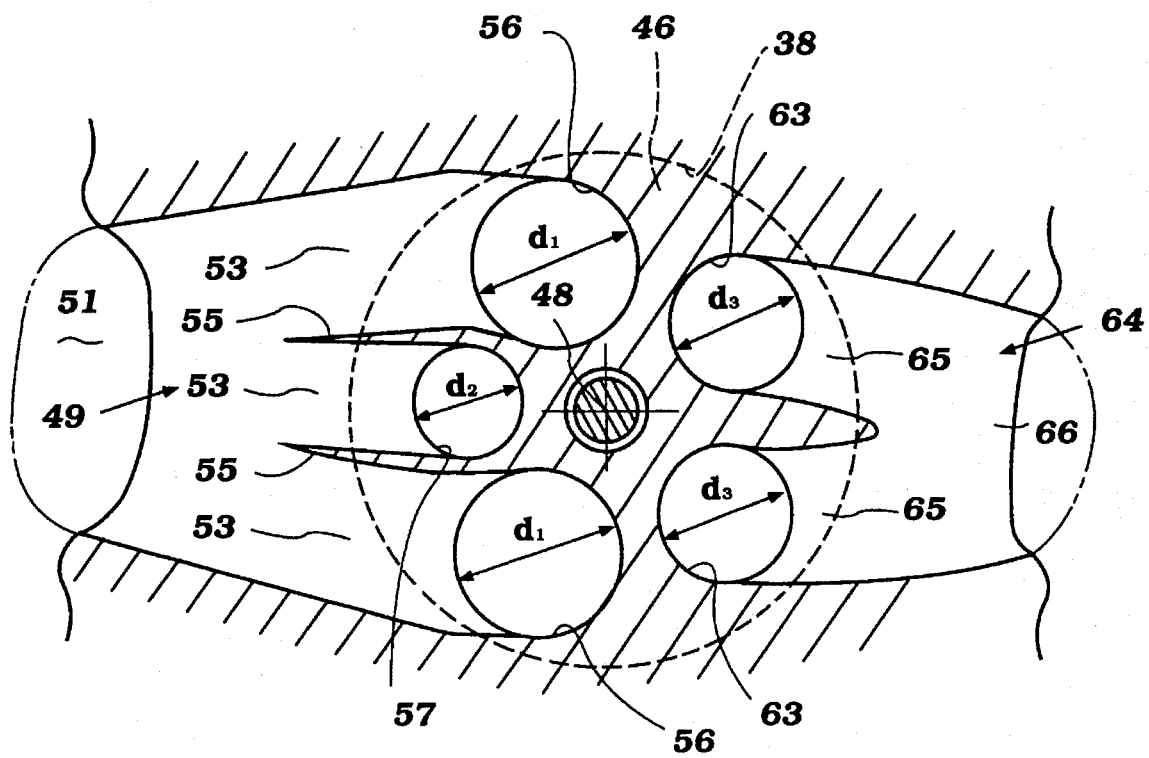
FIG. 3 is a cross-sectional view taken through the cylinder head intake and exhaust passages so as to show their configuration.

The center intake passage portion 54 terminates at a center intake valve seat 57 which is disposed between the side valve seats 56 but further from the plane containing the cylinder bore axis 48 from these valve seats. However, the center intake valve seat 57 is provided with a diameter $d_2$ that is substantially smaller than the diameters $d_1$ so that it may be disposed spaced from the cylinder bore surface 38 toward the axis 48 as best shown in FIG. 3. The center intake passage portion 54 and center valve seat 57 are disposed so that the charge entering the combustion chamber will flow in a generally axial direction. The flow in this direction will cause some reverse tumble (in a counter-clockwise direction). However, the diameter $d_2$ is substantially smaller than the diameter $d_1$ and the valve seat 57 is closer to the cylinder bore axis 48 than conventional constructions so that this reverse tumble will be relatively small under low-speed and low-load conditions when the tumble from the side intake valve seats 56 will be most effective. Of course, the specific diametrol relationships may be chosen so as to seek the particular running conditions of the engine and the particular performance which is desired.

Poppet-type intake valves, each indicated by the reference numeral 58 are slidably supported in the cylinder had 33. Each of these valves 58 has a stem portion 59 that is reciprocally supported within a valve guide 61 that is cast or pressed into the cylinder head 33 in a known manner. These valves 58 have head portions 62 that cooperate with the respective valve seats 56 and 57 so as to control the flow therethrough. The valves 58 are operated in a manner which will be described.

It should be noted that the side intake valves 58 reciprocate about axes A which lie in a common plane-that is disposed at an acute angle to the plane containing the cylinder bore axis 48 which has been previously referred to. In a like manner, the center intake valve 62 reciprocates about an axis B which is also disposed at an acute angle to this plane but which is less than the acute defined by the plane containing the axes A.

On the exhaust side of the plane containing the cylinder bore axis 48 there are provided a pair of exhaust valve seats 63. Like the intake valve seats 56 and 57, the exhaust valve seat 63 may be formed by pressed or cast-in inserts. The exhaust valve seats 63 have a diameter $d_3$ which diameter is larger than the diameter $d_2$ of the center intake valve seat but smaller than the diameter $d_1$ of the side intake valve seats 56.

An exhaust passage, indicated generally by the reference numeral 64 has a pair of branch portions 65 that extend from the valve seats 63 and which merge into a common section 66 which opens through an outer face 67 of the cylinder head 33 to which an exhaust manifold (not shown) is affixed for collecting the exhaust gases and discharging them to the atmosphere through a suitable exhaust system.

A pair of poppet-type exhaust valves 68 are slidably supported in valve guides 69 that are cast or pressed in place in the cylinder head 33. These exhaust valves 68 have head portions 71 that cooperate with the valve seat 63 to control the flow therethrough. The exhaust valve 68 reciprocate about axes C which lie in a common plane that is disposed at an acute angle to the plane containing the cylinder bore axis 48 but on the side opposite the axes A and B of the side and center intake valves 58, respectively. The angle of the plane containing the axes C is greater than or equal to the angle of the plane containing the axis A and less than the angle of the plane containing the axis B.

The intake and exhaust valves 58 and 68 are each urged in their closed positions by means of respective coil spring assemblies 72. The coil spring assemblies 72 bear against respective cylinder head surfaces 73 that are machined around the valve guides 61 and 69 at the lower ends of the springs 62. The upper ends of the springs 72 act on the respective intake and exhaust valves 58 and 68, respectively, through keeper retainer assemblies 74 that are affixed thereto in a well-known manner.

An intake valve actuating mechanism, indicated generally by the reference numeral 75 is provided on the intake side of the plane containing the cylinder bore axis 48 for actuating each of the intake valves 58. This valve actuating mechanism 75 is contained within a cam chamber 76 formed at the upper end of the cylinder head 33 and closed by the aforenoted cam cover 37.

This valve actuating mechanism 75 includes an intake camshaft, indicated generally by the reference numeral 76 and which is supported in the cylinder head 33 for rotation about an axis I which axis lies at the intersection of the planes containing the valve reciprocal axes A and B aforenoted. This camshaft 76 has bearing portions which are formed between its cam lobes, which cam lobes are indicated generally by the reference numeral 78 and which are comprised of an opening portion $78_o$ and a closing portion $78_c$.

These opening and closing portions $78_o$ and $78_c$ are disposed on opposite sides of a tip 79 which is disposed at a distance from the rotational axis I which determines the maximum lift of the valves 58. A heel portion 81 is formed in the area diametrically opposite to the tip 79 and determines the closed position of the valves 58. In this closed position, there is a slight gap between the heel portion 81 and thimble tappets 82 which are slidably supported within the cylinder head 33 and bores 83 formed therein. Adjusting shims 84 are interposed between the tips of the valve stems 59 and the underside of the tappets 82 so as to establish this clearance, as is well known in this art.

The diameter of the tappets 82 associated with each of the valves 58 is related to the diameter of the valve head portion 62. That is, the tappets associated with the side intake valve have a larger diameter than those associated with the center intake valve. Although the center intake valve tappet may be disposed coaxially with the respective valve axis B, the axes of the tappets 84 associated with the side intake valve 62 which axes are indicated by the line 85 are offset by a distance F from the plane containing the axis A and in a direction opposite the direction of rotation of the intake camshaft 75 which is indicated by the directional arrow $R_i$ in FIG. 2, this being a counter-clockwise direction. This is also offset from the rotational axis I from the intake camshaft 75 so that the heel contact of the intake camshaft 75 will be generally aligned with the valve axes A of the side intake valves 58. The cam lobe opening surface $78_o$ subtends an arc $\theta_{io}$ that is substantially greater than the arc of the closing surface $78_c$ indicated at $\theta i_c$. Also, the slope of the opening surface $78_o$ is of a lesser radius, indicated at $R_o$ than the closing radius $R_c$. As a result of this, and as will be described later by reference to FIG. 6, the intake valve 58 and specifically the side intake valves open over a longer time period and at a lower rate than the intake valves 58 close. The reason for this will be described later by reference to FIG. 6.

The intake camshaft 75 is driven by a suitable cam drive from the crankshaft 45 at one-half crankshaft speed. This speed reduction may be obtained in either a single or staged operation. In addition, the camshaft 76 may be driven either by a tooth belt, a chain or a gear train. Since the actual driving mechanism forms no part of the invention, a further description of it is not believed to be necessary to understand the invention.

The mechanism for operating the exhaust valves 68 will now be described by particular reference to FIGS. 2, 4, and 5. This mechanism is indicated generally by the reference numeral 86 and includes an exhaust camshaft 87 which is journaled in the cylinder head 33 for rotation about an axis. E which axis is offset a distance G from the exhaust valve axis C toward the cylinder bore axis 48. The exhaust camshaft 87 is driven from the intake camshaft 76 by a suitable drive such as a gear train so that its rotational direction $R_e$ will be in the opposite direction of the that of the intake camshaft $R_i$. Thus, the exhaust camshaft 87 rotates in a clockwise direction.

The exhaust camshaft 87 cooperates with thimble tappets 88 which are slidably supported within bores 89 formed in the cylinder head 33. The axes of the thimble tappets 88 lie on the line 89 which is offset a distance H from the exhaust camshaft rotational axis E so as to be disposed between the valve axes C and the exhaust camshaft rotational axis E.

Figure 2:
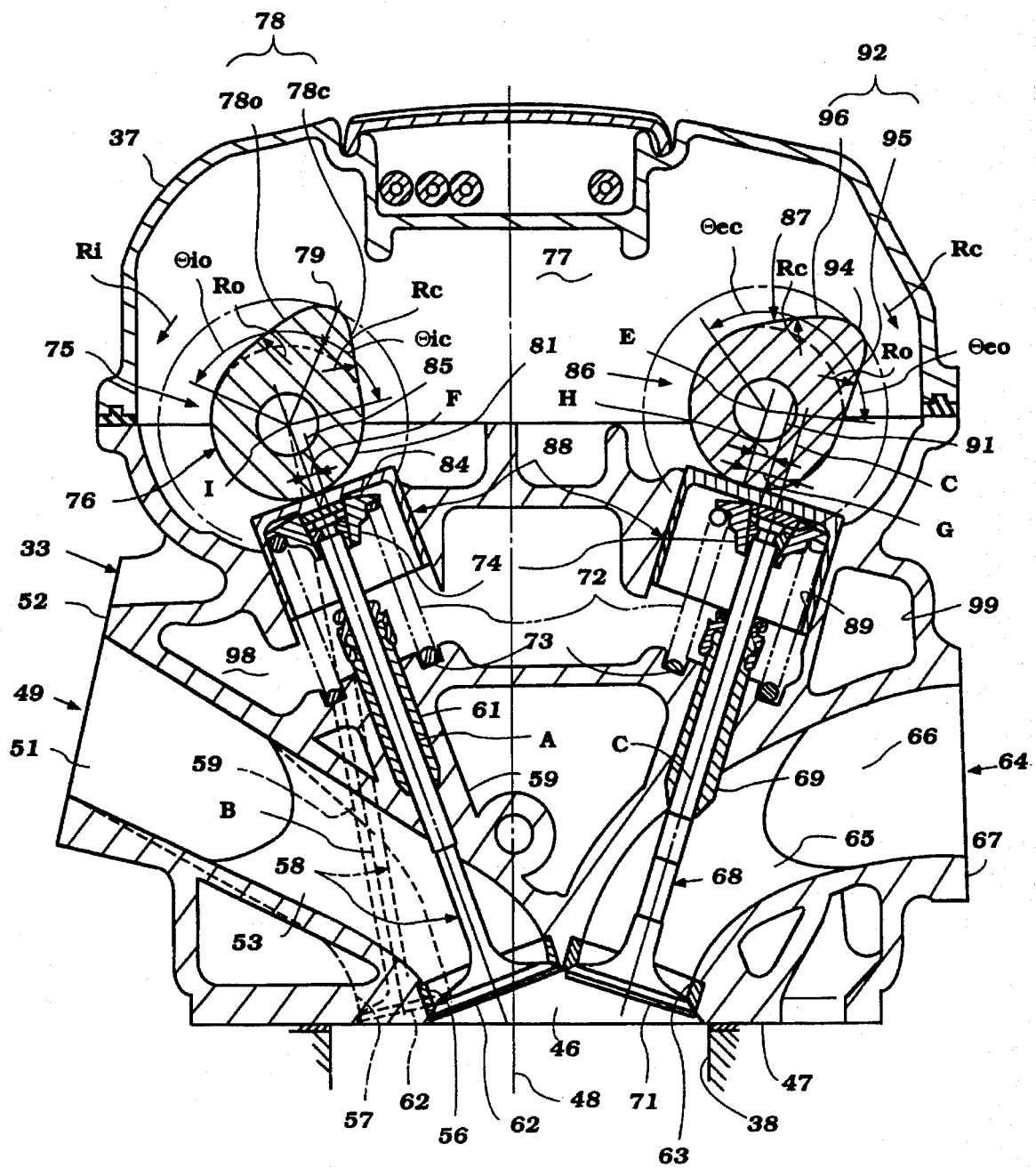
FIG. 2 is an enlarged cross-sectional view of the cylinder head and upper portion of the cylinder block and looking in the same direction as FIG. 1.
Figure 4:
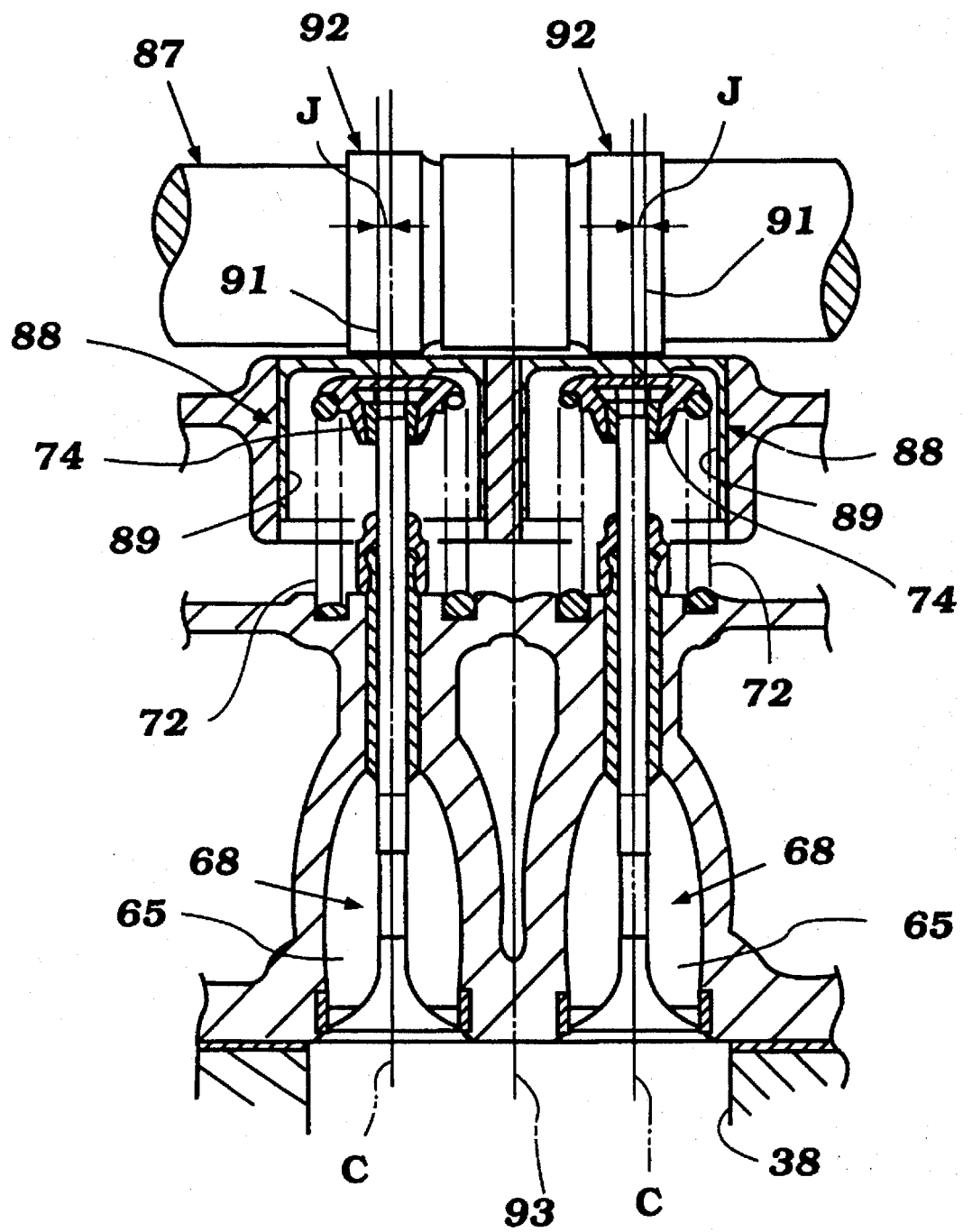
FIG. 4 is a cross-sectional view taken along a plane perpendicular to the plane of FIG. 2 and on the exhaust side thereof.

In addition to this offsetting of the thimble tappets 88 in a direction looking in the direction of the crankshaft axis as seen in FIG. 2, the camshaft lobes 92 are also disposed as seen in FIG. 4 so that their center lines are aligned with the axes C of the exhaust valves 68 in this plane. However, the tappet axes 91 are offset away from a plane 93 containing the cylinder bore axis 48 and perpendicular to the aforenoted plane containing this axis outwardly by a distance J. As a result, the eccentric contact between the cam lobes 92 and the tappets 88 will effect rotation of the tappets 88 in their supporting bores 89 so as to make the wear on them uniform.

The cam lobes 92 are comprised of a tip portion 94 the height of which relative to the axis E will determine the total lift of the exhaust valve 71. Opposite sides are provided with an opening portion 95 and a closing portion 96. The opening portion 95 has a larger radius $R_o$ than the closing portion radius $R_c$ so as to provide a more rapid opening than closing.

In addition, the opening portion subtends an arc $\theta_{eo}$ which is larger than the closing ramp $\theta_{ec}$. As a result, the exhaust valves 71 will be opened more rapidly than they are closed, the opposite of the effect of the intake valves 58. As may be seen from FIGS. 4 and 5, the offsetting of the tappet bodies 88 from the plane 93 by the eccentricity J, in addition to creating a rotational force on the tappets 88 will permit the tappets 88 to have a smaller diameter than if they were not eccentrically disposed without reducing their actual contract area with the cam lobes 92. As may be seen in FIG. 3, the exhaust valve seats 63 are spaced more closely than the side intake valve seats 56 and in order to use a large tappet diameter, it is necessary to space the tappets 88 further from each other than the intake valve 68 are positioned. In addition, the eccentricity permits the diameter of the tappets to be made smaller as noted above.

Figure 5:
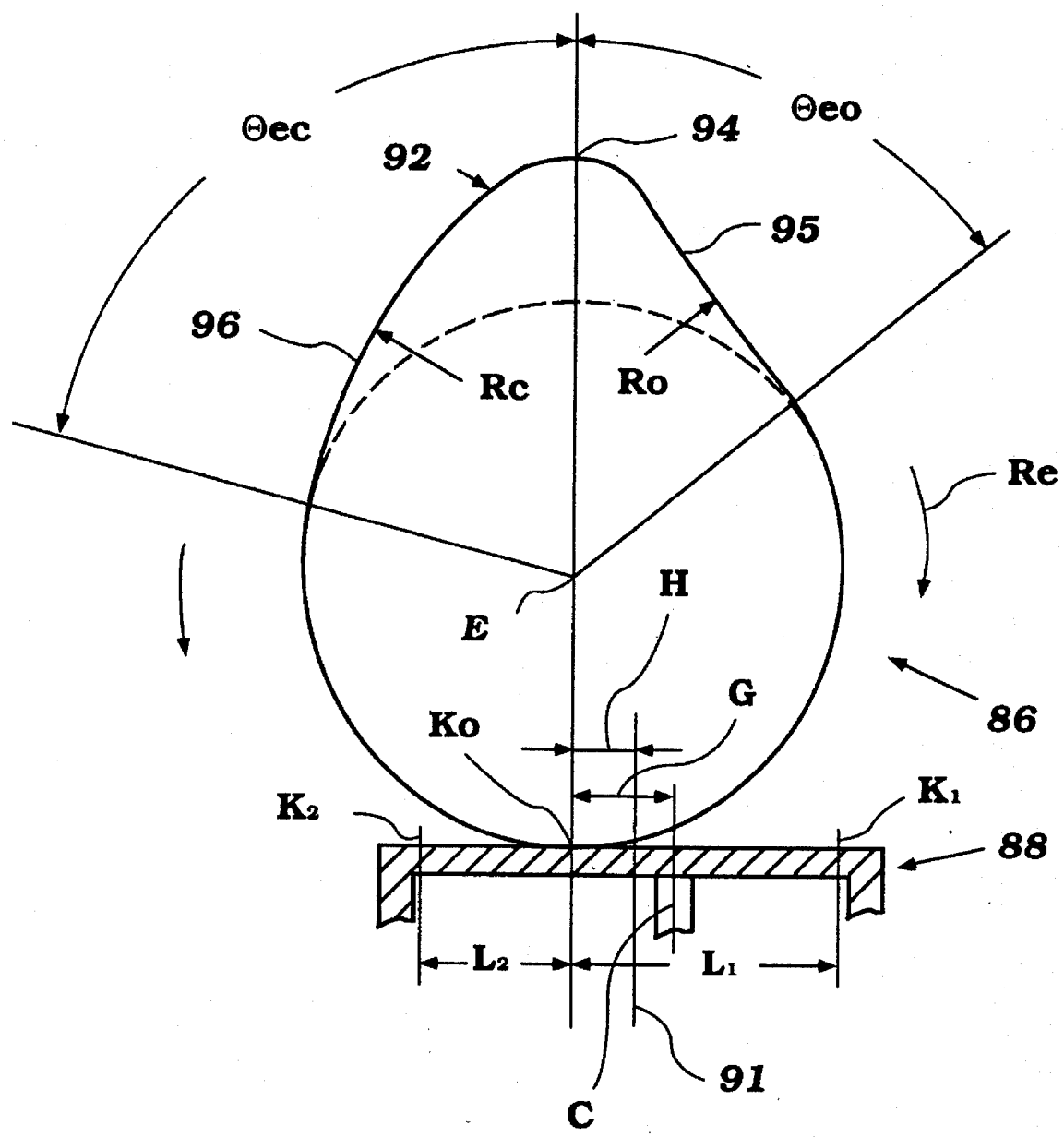
FIG. 5 is an enlarged view looking in the same direction as FIG. 2 and shows the cam tappet and valve relationship.

This may be understood by reference to FIG. 5, wherein it is seen that when the exhaust valves 71 are closed the heel portion 97 of the exhaust cam lobes 92 will be contacting at a point $K_0$ on the perpendicular line passing through the exhaust camshaft axis E. As the exhaust cam 92 rotates in its clockwise, opening direction, it will progressively contact the head of the tappet 88, with the contact moving out to the point $K_1$ which is disposed at a distance $L_1$ from the plane containing the axis E. However, because of the more rapid closing over a smaller angle, the maximum contact on the closing side is at the point $K_2$, which is at a distance $L_2$ from the plane, which distance is less than the distance $L_1$.

Thus, it should be apparent that if the tappets were disposed so that their centers 91 were on the plane containing the axis E, the diameter would have to be something larger than $2_x L_1$. However, by offsetting, it is possible to use the smaller diameter $L_1+L_2$.

It should be noted that the lifting and closing portions of both the intake camshaft 76 and the exhaust camshaft 87 have been described as having radius of curvature. Obviously, however, the shape is not uniform, and there is not a radius per se, but rather a series of radii that make up the shape of the lifting and closing portions of the camshafts. However, the term "radius" as used herein, both in the specification and claims, is intended to describe the general configuration, and it should be apparent that the average radius of the more rapid movement portions of the cams is larger than that of the less rapid movement side. Hence, the radius of the opening side 78o of the intake camshaft 76 is less than that of its closing side 78c. With the exhaust camshaft 87, on the other hand, the radius of the opening side 95 is substantially greater than that of the closing side 96 because this valve opens more rapidly than it closes.

It should be noted that the engine 31 is water cooled, and the cylinder head 33 is provided with a main cooling jacket portion 98. In order to optimize the combustion chamber shape, the exhaust tappets 88 are moved inwardly toward the center of the cylinder head, away from the exhaust passages 64. In addition, a cooling jacket 99 may be formed on the outer side of the tappet bores 89 so as to further isolate them from the heat of the exhaust.

Figure 6:
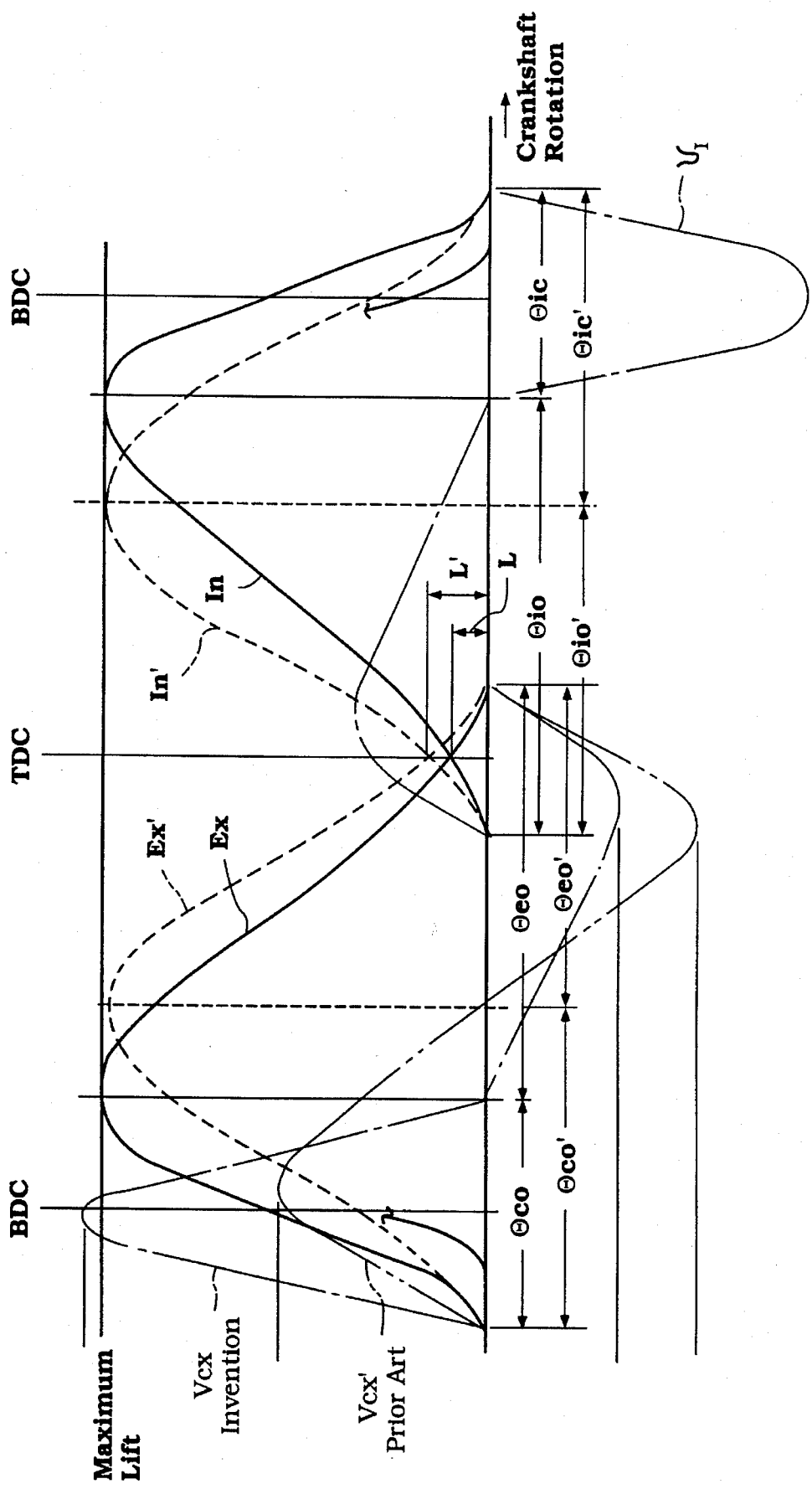
FIG. 6 is a timing diagram showing the intake and exhaust valve opening and closing of a conventional engine, in broken lines, and an engine constructed in accordance with an embodiment of the invention, in solid lines and also shows the rate of change of velocity of the valve.

The advantages in engine operation of the asymmetric configuration of the intake and exhaust camshafts 76 and 87 will now be described by reference to FIG. 6. In FIG. 6 the exhaust valve and intake valve opening curves are shown in solid lines and are compared with conventional symmetric camshafts shown in the dotted-line curves. It will be explained from these figures how the asymmetric shape permits the obtainment of not only better breathing for the engine, but also a minimum of flow of exhaust gases into the intake passages during the overlap period. It will be seen that the lift provided by the intake and exhaust cams 76 and 87, respectively, and by their tip portions 79 and 94 is the same as that of the conventional symmetric cam mechanism. However, by using an asymmetric shape, as will become apparent, it is possible to improve both exhaust and intake efficiency.

Referring now in detail to FIG. 6 and starting at the left-hand side thereof, the condition is shown when the charge in the combustion chamber 46 has been fired and has expanded to the point where the piston 39 is approaching its bottom dead center position. It should be seen that the exhaust valve of this invention begins to open at about the same time as the conventional exhaust valve, but the opening movement is at a substantially greater velocity. As a result, the exhaust valves 71 will be fully opened at a time when the exhaust pressure is the highest, and thus exhaust discharge is improved. Also, it should be noted that the exhaust valves 71 will be fully opened in accordance with the invention by the time the pistons 38 reach their bottom dead center position, and hence the exhaust valves will be fully opened at a time when the exhaust gas pressure is still high and the exhaust gases can be readily discharged.

As the piston continues to move upwardly toward its top dead center position, the exhaust valve will begin to close at the point $\theta E_o$, whereas the conventional exhaust valve will not have become fully opened until after this time. The exhaust valve closes more slowly than it opened, and hence it will be maintained in an open position for a longer interval on the closing side. However, it will become more fully closed than the conventional exhaust valve at the time the piston approaches top dead center position. This has two beneficial effects. First, the actual lift of the exhaust valve, indicated at $L_e$, is substantially less than that of the conventional exhaust valve $L_e'$ when the piston is at its top dead center position. This means that the combustion chamber volume can be made smaller with this invention, and thus the compression ratio can be raised without fear of clearance problems or without necessitating large recesses in the heads of the pistons. In addition, this more full closure of the exhaust valve at this time reduces the overlap between that of the intake valve and the exhaust valve as also seen in this figure.

In addition to the aforenoted advantages, by delaying the opening of the exhaust valve to its maximum extent, it is also possible to permit the gases to fully expand and derive maximum power output from the engine. In addition, this full expansion of the exhaust gases also lowers their temperature so that exhausting of them will be easier and more efficient.

It should be noted that the intake valve in accordance with this embodiment has begun to open before the piston reaches top dead center, but at a slower rate than with the conventional construction due to the fact that the intake valve opening is slower than its closing. Thus, the lift of the intake valve is also less than that of the conventional intake valve under this time period, and thus the overlapping area is substantially less and there is less likelihood of exhaust gases backflowing into the intake valve and diluting the intake charge. In addition, the clearance requirements of the intake valves is less, and thus a higher compression rate can be achieved.

Since the intake valve is opened slower and at a lesser amount than the conventional intake valve, the intake valve does not fully open until much closer to bottom dead center position than with the prior art type of constructions. As a result, the intake valve opening more closely matches the increase in volume in the combustion chamber, and the intake charge can be drawn in more efficiently since the reduced pressure in the combustion chamber can be built up so as to improve charging efficiency. Again, as the piston reaches bottom dead center position, the intake valve in accordance with this invention will close more rapidly, but will still be open sufficient time so as to maintain good volumetric efficiency.

This figure also shows in dot-dash lines the velocity of the valves in this embodiment and those of conventional valves in the double dot-dash lines. It will be seen that the velocity on opening reaches a higher velocity much sooner, and at the same time the velocity on closing of the exhaust valve is slower than the conventional. The intake valve opening and closing is in the opposite ratio so as to provide the results as aforenoted.

Because of the fact that the exhaust camshaft contacts the tappet 88 on one side of its axis during the opening movement, there can be a bending force applied to it. However, since the exhaust valve axis C is offset the distance G in the same direction, it will absorb some of the uneven bending forces on the tappet 88 and reduce the likelihood of cocking and uneven wear.

Figure 7:
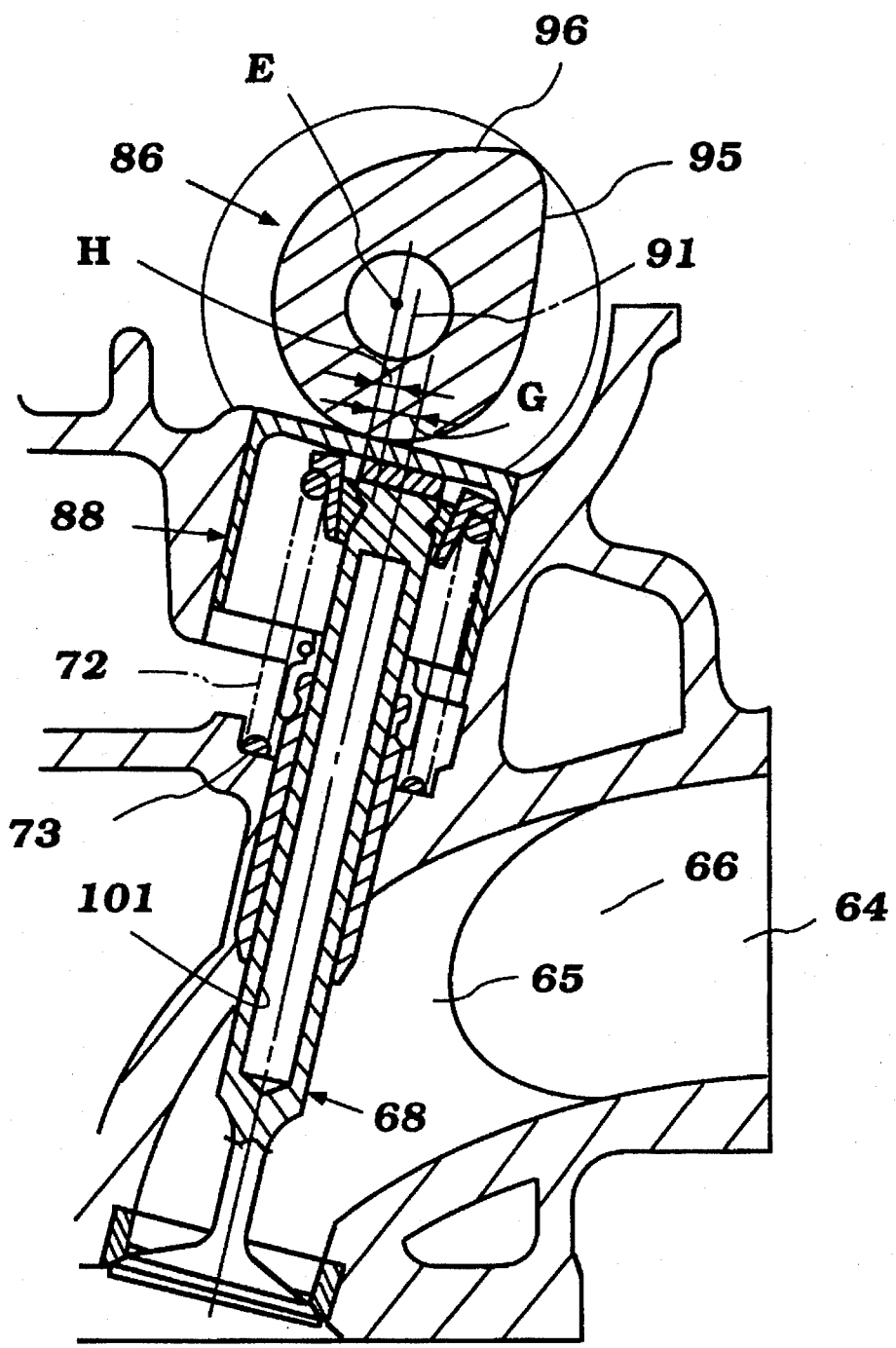
FIG. 7 is a partial cross-sectional view, in part similar to FIG. 2, and shows another embodiment of the invention.

FIG. 7 shows another embodiment wherein this result is achieved by providing a larger diameter for the stem of the exhaust valve. By using such a larger diameter, the exhaust valve stem may be hollow, as shown at 101, and this will permit the use of sodium cooling, if desired.

Figure 8:
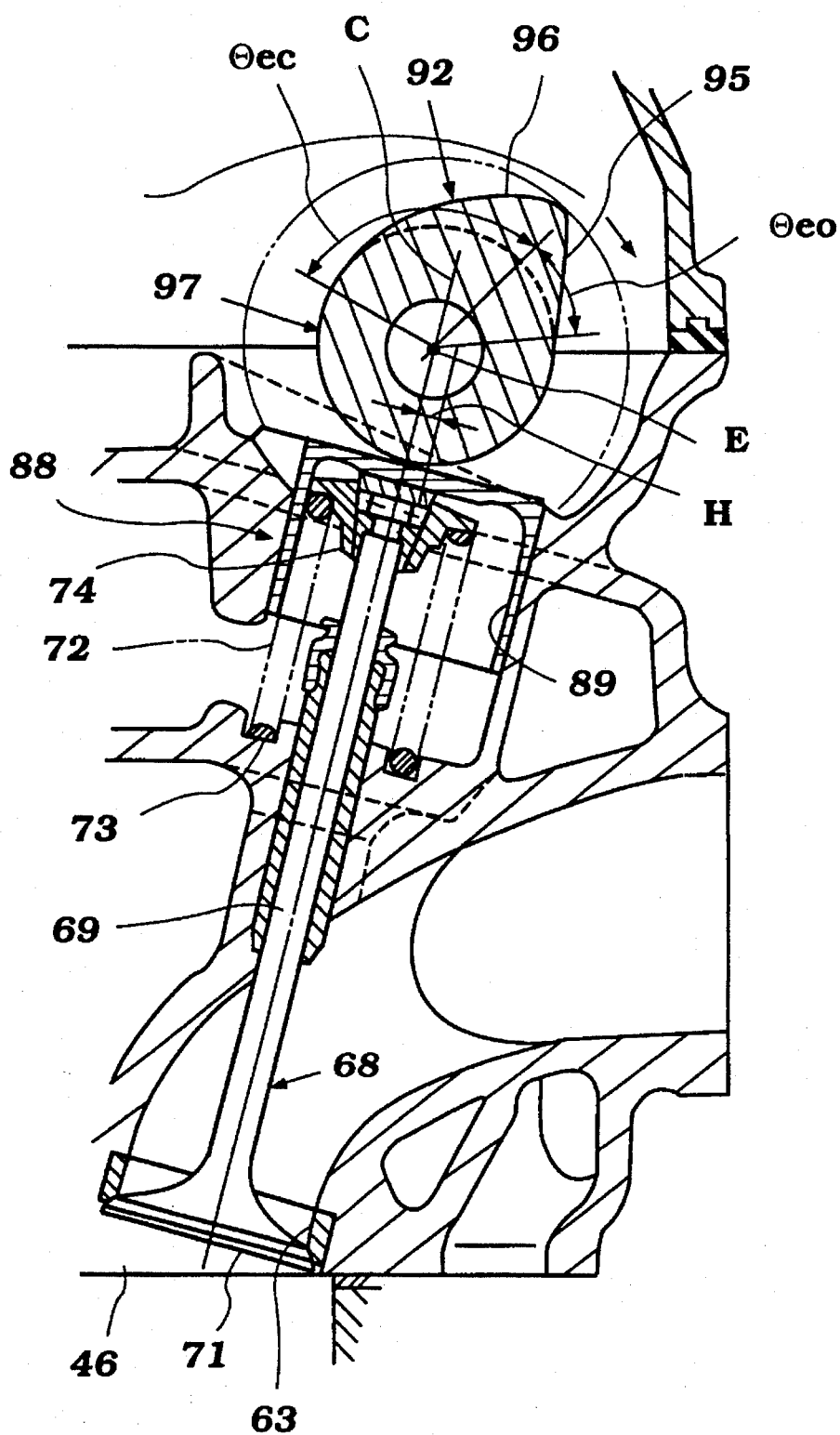
FIG. 8 is a partial cross-sectional view, in part similar to FIGS. 2 and 7, and shows a still further embodiment of the invention.

It should be noted that the intake valve also is offset relative to its tappet 82 in the same direction so that on the opening operation there will be more support for the tappet 82 and less likelihood of cocking in its bore. Although this arrangement, and particularly on the exhaust side, is useful, it is not necessary; and as shown in FIG. 8 it is possible to locate the exhaust valve 68 so that its axis C intersects the exhaust camshaft rotational axis E.

It has been noted that with this invention the overlap between the closing of the exhaust valve and the opening of the intake valve may be of the same duration as with a conventional structure, but the actual valve opening amount during this overlap period is substantial, and thus backflow of exhaust gases into the intake passage is substantially reduced.

Figure 9:
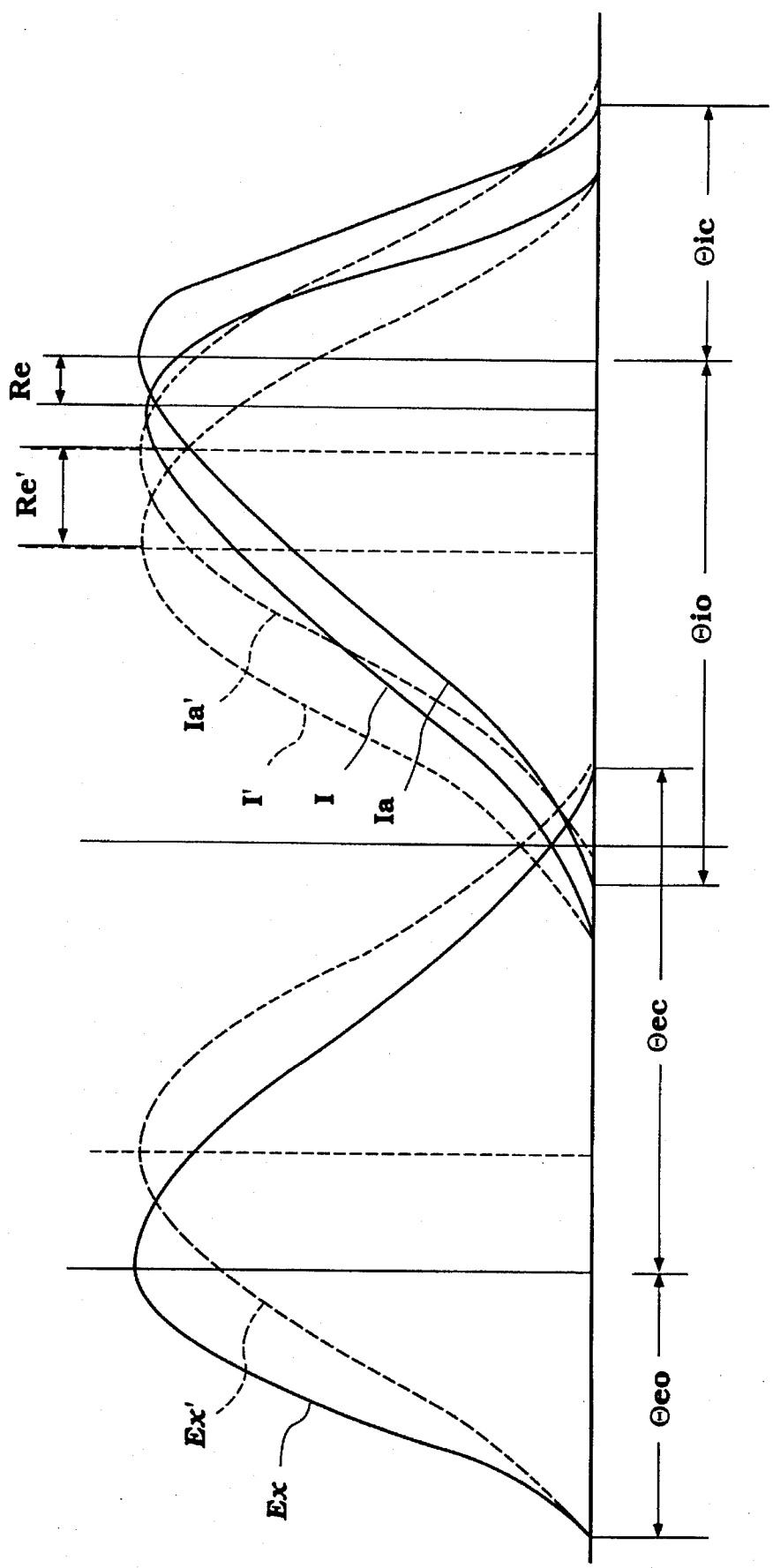
FIG. 9 is a graphical view showing the valve timing during a single cycle of operation, of a conventional engine, an engine constructed in accordance with an embodiment of the invention and of a further embodiment of the invention, including variable valve timing on the intake side.

To achieve the same result, conventional engines may at times use variable valve timing so as to retard the time when the intake valve is open, as shown in FIG. 9. The intake valve timing is varied in the range between the curve I' and $I_A'$. Variable valve timing may also be utilized in conjunction with this invention, even though it is not as necessary. However, because of the advantages of the opening and closing curves of the intake and exhaust valves, respectively, there need be less retardation $R_e$ in order to achieve an even greater result than with the conventional arrangement. Thus, the loading on the variable valve timing mechanism can be substantially less, and therefore, the system can provide better results with more durability for the engine.

Figure 10:
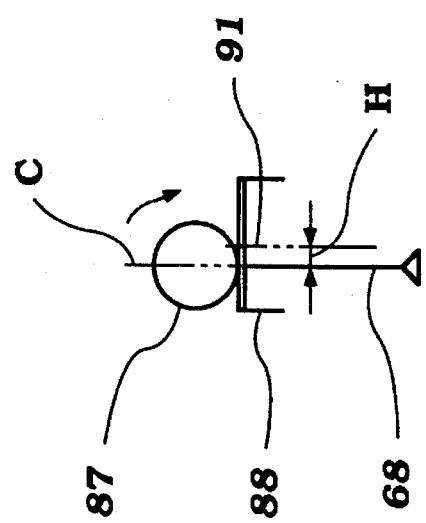

As should be apparent from the foregoing description, there are a number of ways in which the various components can be arranged so as to provide maximum clearance and/or the desired combustion chamber configuration. In addition to those arrangements illustrated and described previously, FIGS. 10, 11, and 12 show three additional variations. In these figures the exhaust camshaft 87 has been illustrated and its relationship with the exhaust valve tappet 88 and the exhaust valve 68. It will be readily apparent to those skilled in the art, however, how these embodiments can also be applied to the intake side of the engine. In FIG. 10 the axis C of reciprocation of the exhaust valve is disposed so as to intersect the camshaft axis E. The center 91 of the tappet 88 is, however, disposed eccentrically at an amount indicated as the dimension H in this figure to the right side of the aforenoted common axes C and E.

Figure 11:
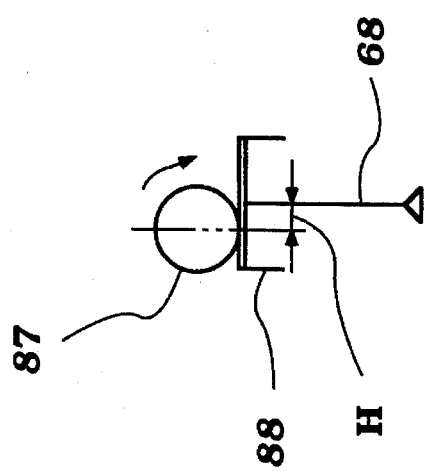

FIG. 11 shows an embodiment wherein the valve axis C is disposed coincident with the tappet axis 91. The camshaft axis E is offset by the distance H to the left in this figure.

Figure 12:
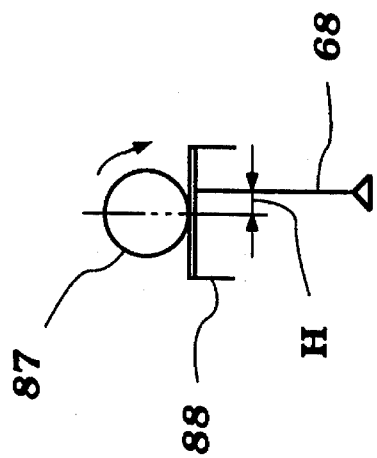
FIGS. 10, 11, and 12 are schematic cross-sectional views, in part similar to FIGS. 2, 5, 7, and 8 and show additional embodiments of the invention.

FIG. 12 shows another variation wherein the tappet axis 91 and camshaft axis E are coincident, and the axis C of the exhaust valve 68 is offset by the distance H. Obviously, the same variations are possible with the intake side, as aforenoted.

In all of the embodiments thus far described, the operation of the intake valves 58 and exhaust valves 68 has been direct operation via thimble tappets. Next will be described embodiments wherein there is indirect operation of the valves through rocker arms, but nevertheless, the same result is obtained; that is, asymmetry between the opening and closing of the respective valves. Since the only difference between this embodiment and the previous embodiment is in the actual manner of valve actuation, where components are the same or substantially the same, they have been identified by the same reference numerals and will be described again only insofar as is necessary to understand the construction and operation of this embodiment.

Referring first primarily to FIGS. 13–16, it should be seen that the intake and exhaust camshafts 76 and 86 are again rotatably journaled in the cylinder head assembly 33. However, in this embodiment these camshafts are journaled somewhat higher and are spaced transversely outwardly from the valves which they operate from the axis of the cylinder bore.

Figure 13:
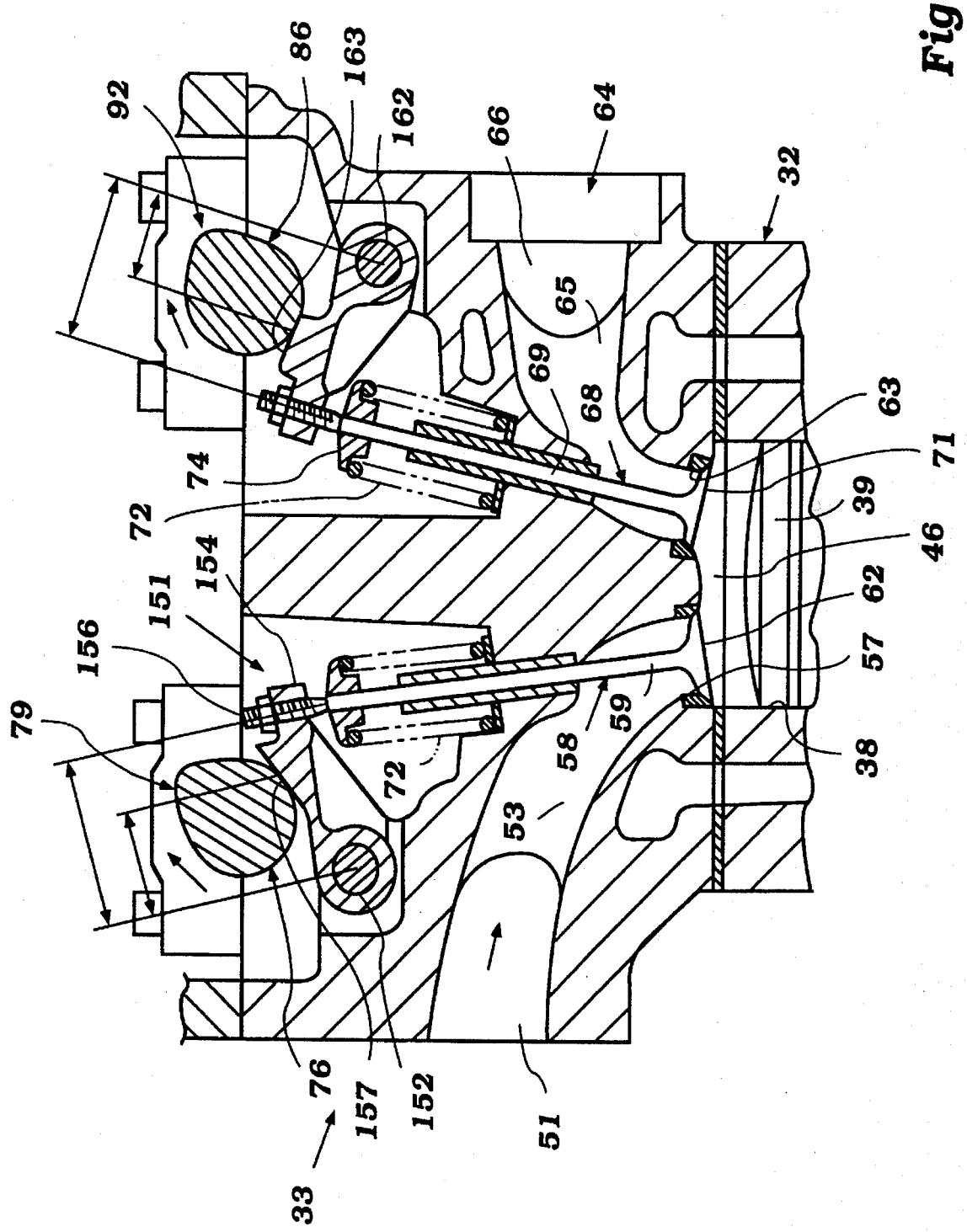
FIG. 13 is a cross-sectional view, in part similar to FIG. 2, and shows a further embodiment of the invention utilizing rocker arm-type valve actuators.

Interposed between the intake camshaft 76 and each of the intake valves 58 is a rocker arm assembly, indicated generally by the reference numeral 151. That is, a single rocker arm 151 operates all three intake valves 58 associated with a single cylinder bore 38. Where the engine is multiple cylinder, as shown in FIG. 13, a rocker arm 151 is provided for each cylinder. These rocker arms 151 are journaled on a common rocker arm shaft 152 which is, in turn, journaled in the cylinder head 33 in any appropriate manner.

Each rocker arm 151 has a bifurcated configuration comprised of a pair of side arm portions 153 and a center arm portion 154. The side arm portions 153 carry adjusting screws 155 which cooperate with the tips of the side intake valves 158 for exerting a force on them and for controlling their position. In a similar manner, the center rocker arm portion 154 carries an adjusting screw 156 which cooperates with the center intake valve 58 for actuating it in a manner which should be readily apparent. The rocker arm assembly 151 has a follower portion 157 which is engaged by the cam 76 for operating the three intake valves 158.

In a similar manner, a rocker arm assembly 158 is provided on the exhaust side of the cylinder head 33 and operates each of the exhaust valves 68 for the respective cylinder. Hence, the rocker arms 158 are bifurcated at 159. Each bifurcated end carries an adjusting screw 161 which cooperates with the stem 69 of the exhaust valve 68 for its actuation. Like the intake rocker arms 151, the exhaust rocker arms 158 are journaled on a common rocker arm shaft 162 that is fixed in the cylinder head in an appropriate manner.

The exhaust camshaft 86 lies over the rocker arm 162 and engages a follower surface 163 formed thereon for operating the respective exhaust valves in a manner which should be obvious.

Figure 14:
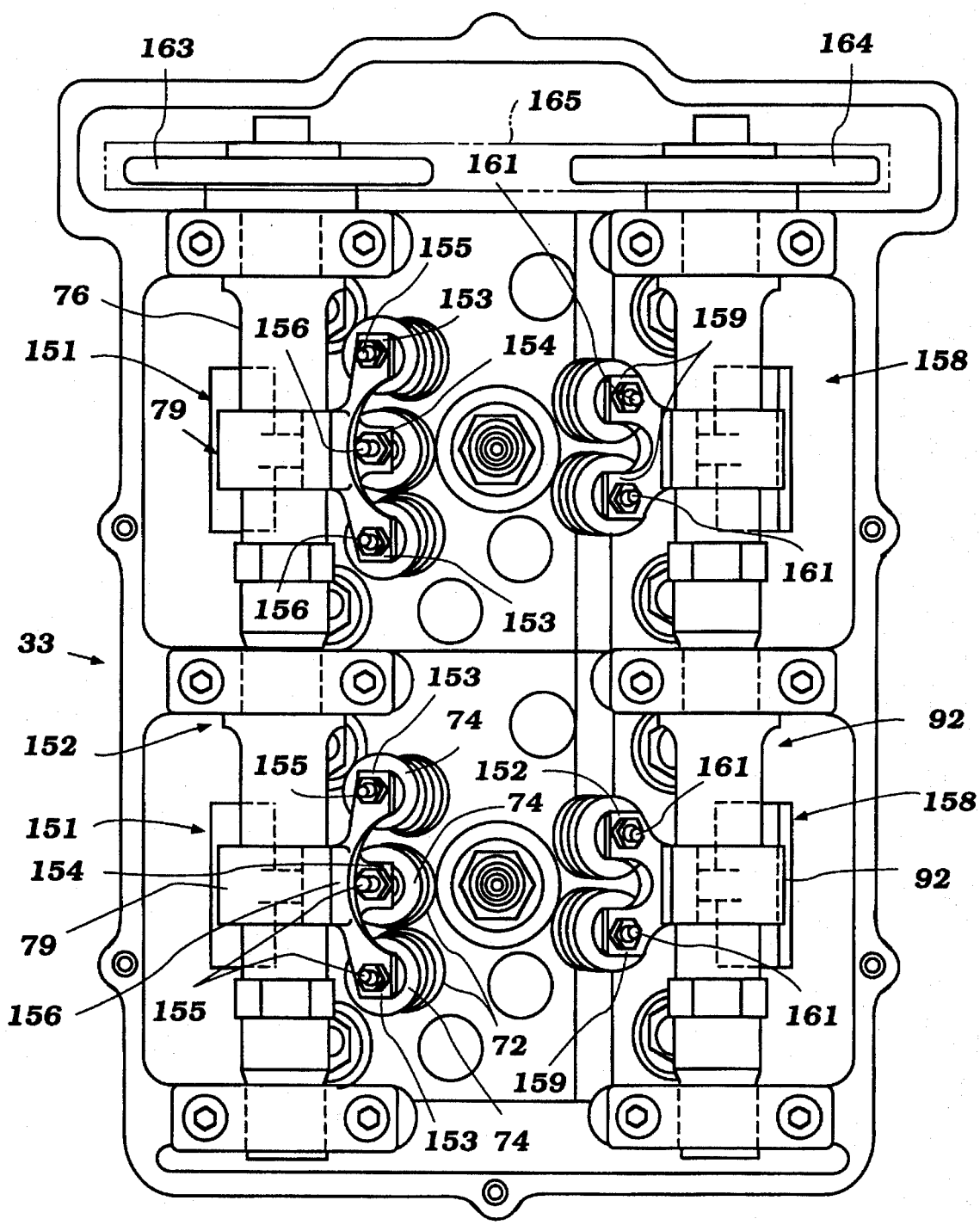
FIG. 14 is a top plan view of the cylinder head of this embodiment with the cam cover removed.

It should be noted that FIG. 14 shows how the camshafts 76 and 87 are driven. Each camshaft has affixed to its extending end a respective sprocket wheel 163 and 164 which are driven by a common flexible transmitter such as a timing chain 165. The timing chain 165 may also be driven directly by the engine crankshaft, and as a result of this relationship, both the intake camshaft 76 and exhaust camshaft 86 rotate in the same, clockwise direction in this embodiment.

Figure 16:
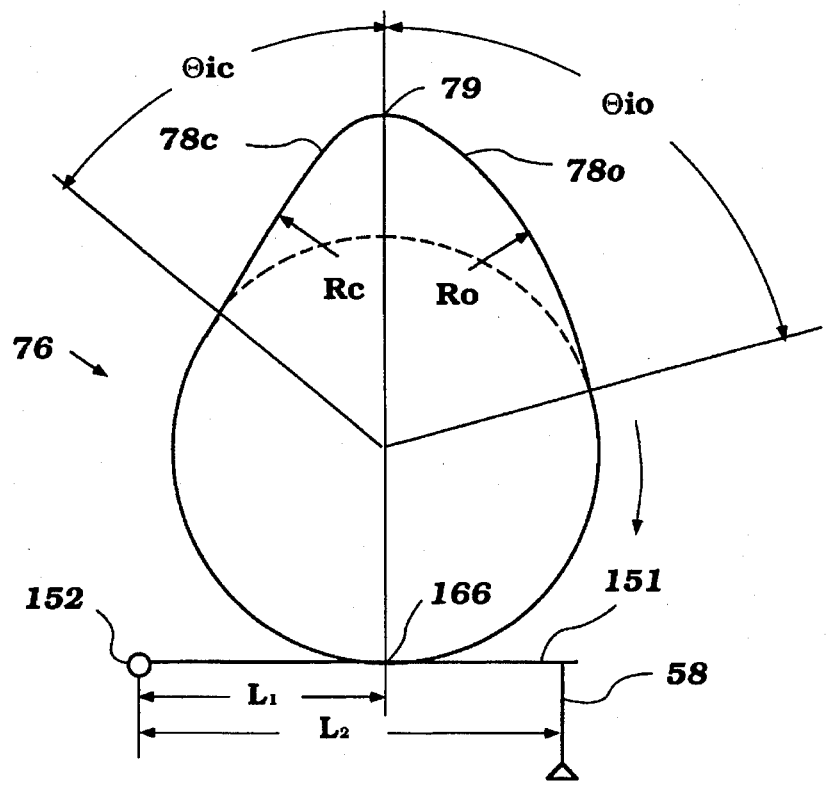
FIG. 16 is a view, in part similar to FIG. 15, but shows the relationship between the intake valve and its actuating camshaft and associated rocker arm.

As may be seen best in FIG. 16, the intake camshaft 76 has its opening surface $78_o$ that extends through an arc $\theta_{io}$ which is longer than the corresponding arc $\theta_{Ic}$ of the closing cam portion 78c. In addition, the radius of the opening side $R_o$ is less than $R_c$ that of the closing side so, like the previously described embodiment, the intake valve will open slower and over a longer duration than will the intake valve close, so as to provide the same results as aforenoted.

However, the range of the rate of closing will be depending upon the actual curvature of the closing side $R_c$ and in order to obtain rapid closing, it may be necessary to provide a negative radius. These radii are, however, more difficult to form and the same effect can be obtained with a non-concave radius by changing the effective lever arm of the rocker arm 151. As may be seen, the cam surfaces $78_o$ and $78_c$ contact the rocker arm 151 at a point approximately indicated at the point 166. It should be understood that this point 166 shifts slightly on rotation of the camshaft 76. However, by changing the length $L_1$ between the point of pivotal support provided by the shaft 152, this length may be changed relatively to the total rocker arm length $L_2$ between the pivot point and the point where the stem of the intake valve 158 is contacted.

Figure 17:
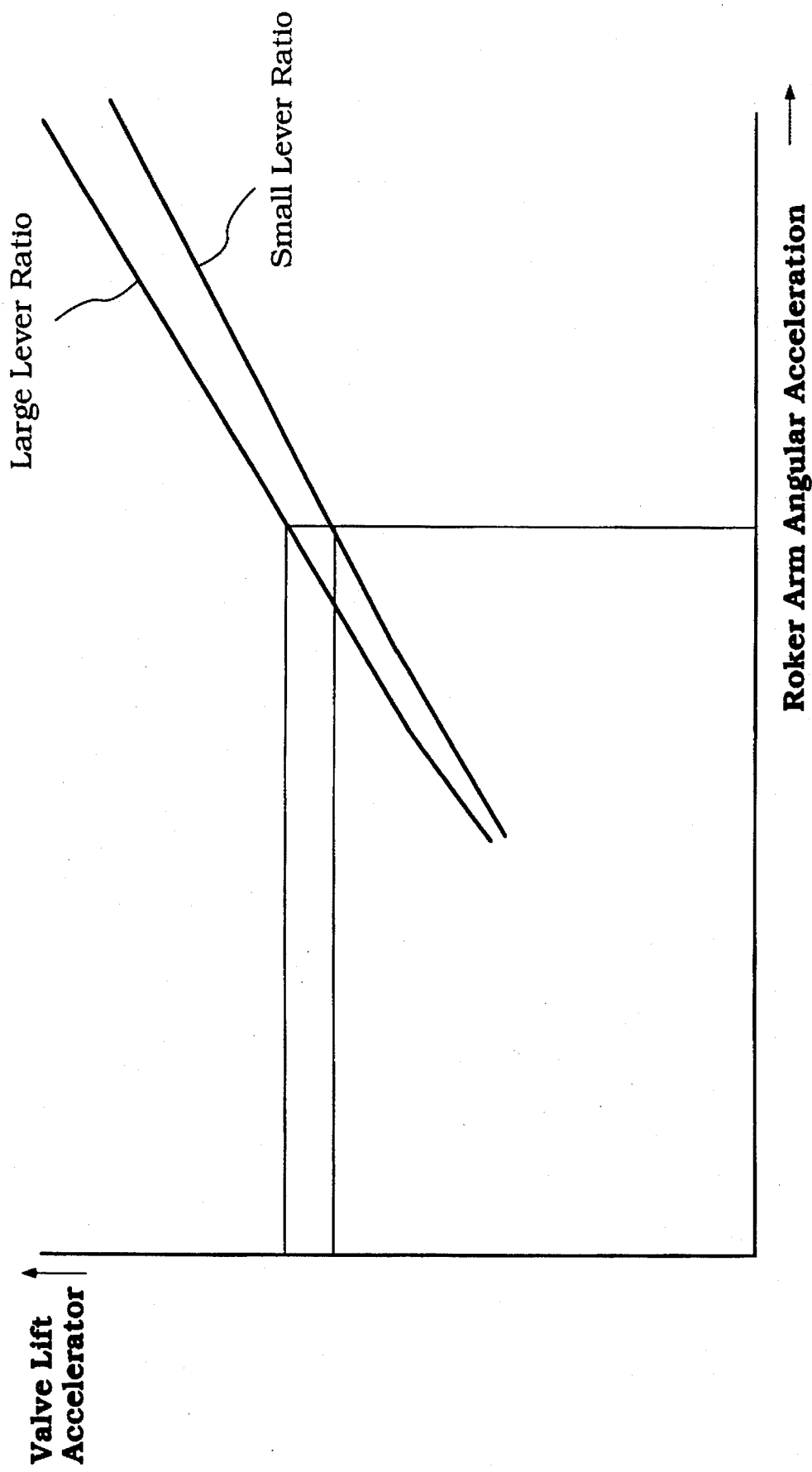
FIG. 17 is a graphical view showing the relationship of lever angle ratios, rocker arm angular acceleration and valve acceleration.

FIG. 17 is a graphical view showing how the valve lift acceleration can be varied with variations in lever ratio at varying rocker arm angular accelerations. The angular acceleration is dictated by the shape of the cam surface and cannot be changed without changing the cam radius. However, by changing the angular relationship, the actual acceleration of opening and closing of the associated valve can be varied.

Figure 18:
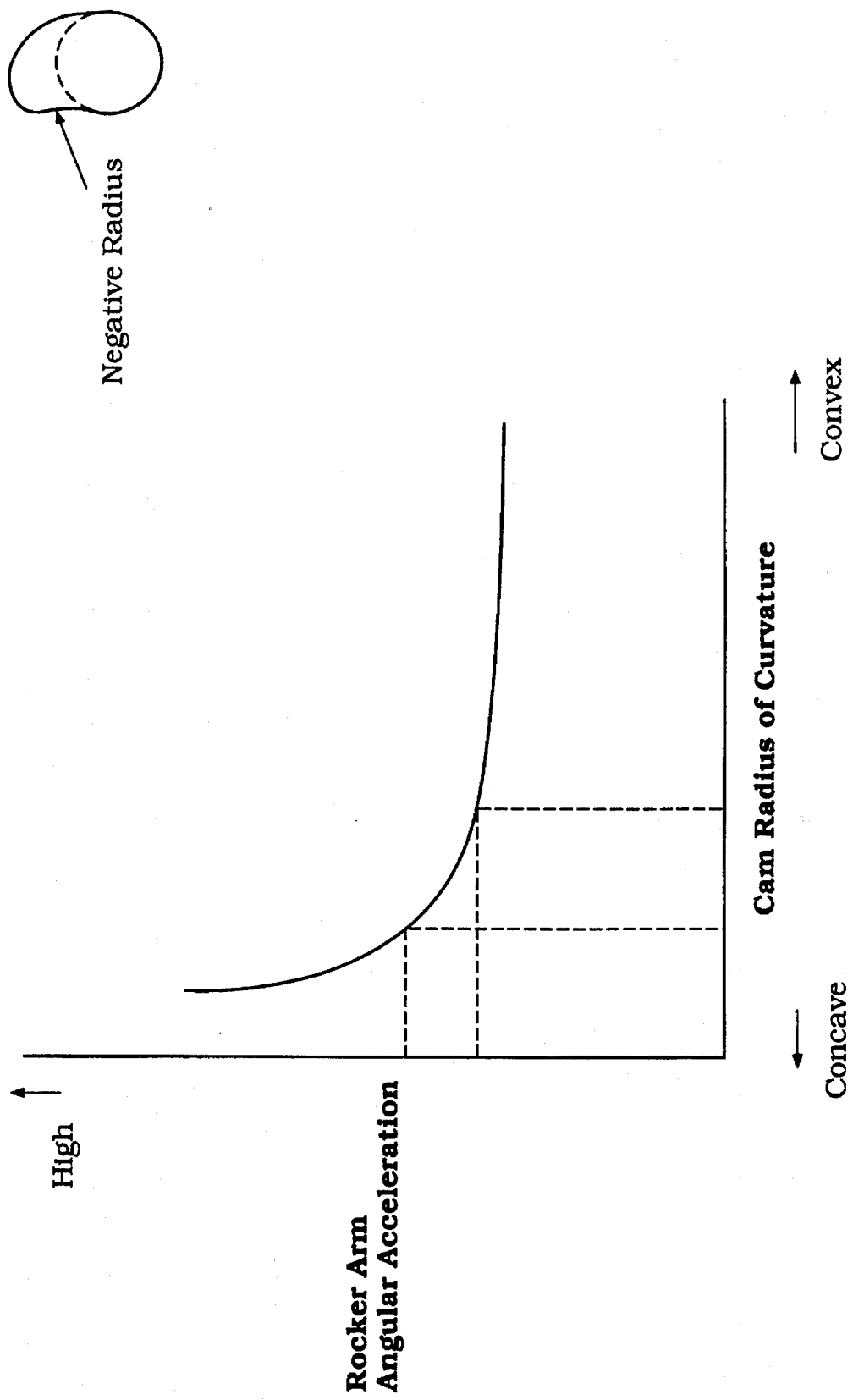
FIG. 18 is a graphical view showing the variations in cam profile curvature and the effect on rocker arm angular acceleration for various cam lobe configurations.

FIG. 18 is a graphical view that shows the relationship of the M radius of curvature to the rocker arm angular acceleration. It will be seen that in order to obtain high angular accelerations, concave configurations may be necessary, as shown in the upper right-hand view of this figure, which illustrates a concave or negative radius of curvature. Thus, resort can be had to changing the effective lever arm ratio in order to achieve the desired rates of acceleration on opening or closing.

Figure 15:
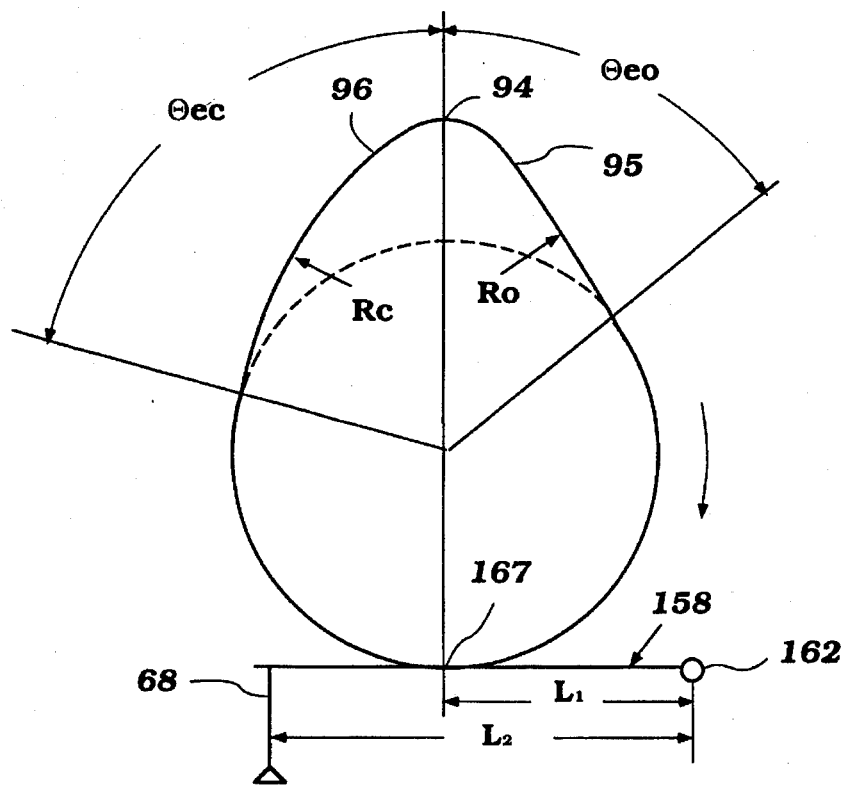
FIG. 15 is an enlarged view showing the configuration of the exhaust camshaft of this embodiment with its relationship to the rocker arm and valve both of which are shown schematically.

FIG. 15 shows the curvature of the exhaust cam and, as with the previously described embodiment, the configuration is such that the lift or opening of the exhaust valve occurs more rapidly and over a shorter duration than does the closing of the exhaust valve. Again, these ratios may be changed in accordance with the manner previously described by changing the point of contact 167 relative to the overall length of the exhaust rocker arm 158 so as to change the lever ratio and obtain the desired valve opening and closing rates.

Figure 19:
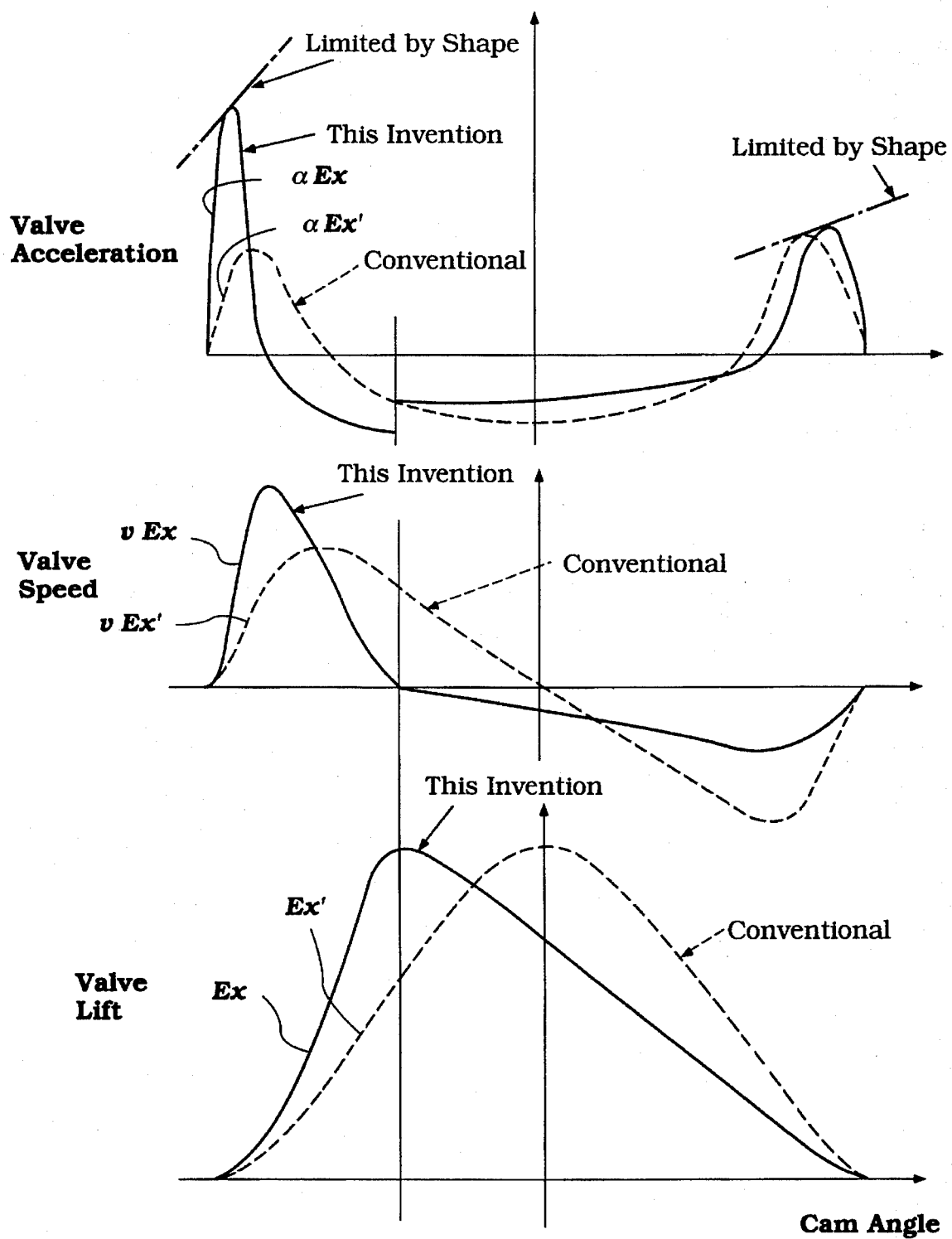
FIG. 19 is a graphical view showing the differences between valve acceleration velocity and valve opening in accordance with this invention and the prior art.

FIG. 19 shows three curves, those of valve acceleration, valve speed and valve lift. This invention is shown in solid lines and the prior art asymmetric arrangement is shown in broken lines. The curves shown are for the exhaust side where there is a more rapid opening and slower closing with a longer duration of closing than opening. Similar curves would be obtained for the intake side, but in the opposite sense.

Figures 20, 21, 22:
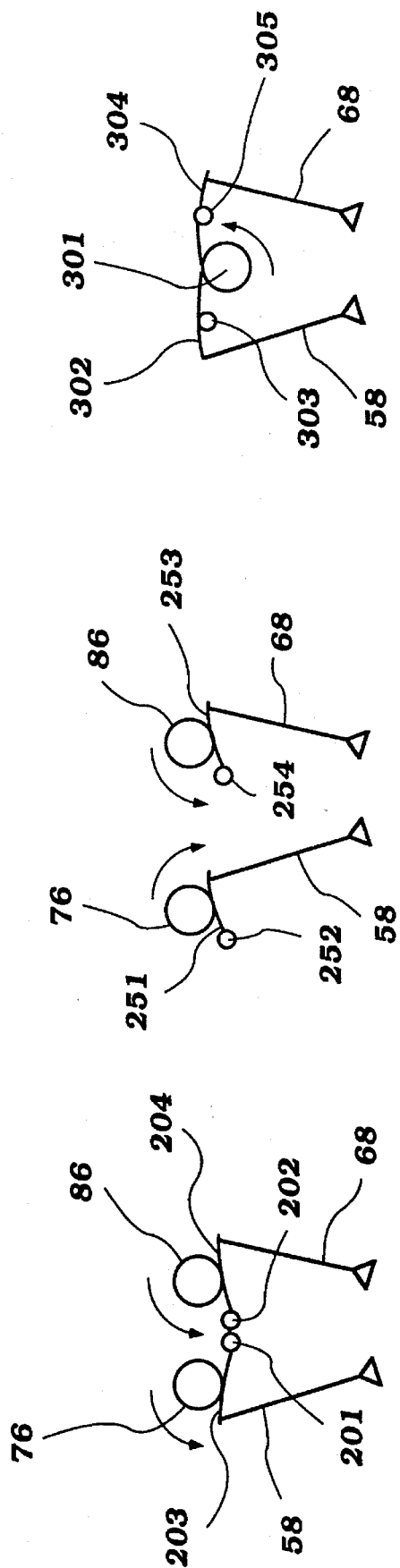
FIGS. 20, 21 and 22 are schematic views showing various arrangements in which the valves may be operated with rocker arms from overhead camshafts in accordance with additional embodiments of the invention.

The specific relationship between the camshafts and the intake and exhaust rocker arms as shown in the embodiment of FIGS. 13–19 is only one configuration which the construction may take. FIGS. 20–22 show other alternative arrangements that can be designed so as to achieve the same effect. Which arrangement is chosen will depend on the overall geometry desired for the cylinder head.

FIG. 20 shows an arrangement wherein the rocker arm shafts, indicated here by the reference numerals 201 and 202, for the respective intake valves 58 and exhaust valves 68 are disposed closer to the longitudinal center line of the cylinder bore 38. The rocker arms 203 and 204 are pivoted at one end on these shafts 201 and 202, respectively, with their outer tips engaging the tips of the valve stems of the intake and exhaust valves 58 and 68, respectively. The intake and exhaust camshafts 76 and 86 are disposed again between the two contact points and the camshafts 76 and 86 rotate in the same direction. In this embodiment, counterclockwise rotation is employed.

FIG. 21 shows another embodiment wherein the intake rocker arm shaft, indicated by the reference numeral 251, is journaled on the outer side of the cylinder head by means of a rocker arm shaft 252. Again, the intake camshaft 76 contacts the rocker arm 251 between its pivot point 252 and its point of engagement with the intake valves 58. On the exhaust side, on the other hand, the exhaust rocker arm 253 is supported on a rocker arm shaft 254 that is mounted toward the center of the cylinder head. Again, the exhaust camshaft 86 engages the rocker arm 253 between its two contact points. With this arrangement, it is better if the camshafts 76 and 86 rotate in opposite directions. Clockwise rotation of the intake camshaft and counterclockwise rotation of the exhaust camshaft 86 is illustrated.

FIG. 22 shows a final illustrated embodiment utilizing rocker arm actuation. In this embodiment, a single camshaft 301 is disposed so as to rotate on the center of the cylinder head. An intake rocker arm 302 is journaled on a rocker arm shaft 303 between the camshaft 301 and the intake valves 58 and operates the intake valves 58.

In a similar manner, an exhaust rocker arm 304 is rotatably journaled on an exhaust rocker arm shaft 305 disposed between the exhaust valves 68 and the camshaft 301 on the inner side of the cylinder head. Separate cam lobes engage the respective rocker arm shafts 302 and 304.

It should be readily apparent that the described embodiments of the invention are very effective in providing good intake charging, good exhaust flow and, at the same time, maintain a compact combustion chamber configuration, since the valve movement is such that minimum clearance at top dead center is required. In addition, overlap between the closing of the exhaust valve and the opening of the intake valve may be minimized or more easily controlled. Of course, the foregoing description is that of preferred embodiments of the invention, and various changes and modifications may be made without departing from the spirit and scope of the invention, as defined by the appended claims.

We claim:

1. An internal combustion engine comprised of a cylinder block having a cylinder bore with a piston reciprocating therein, a cylinder head closing said cylinder bore and having a surface which defines a combustion chamber with said cylinder bore and a head of said piston, said cylinder head surface defining a plurality of intake valve seats generally on one side of said combustion chamber and a plurality of exhaust valve seats generally on the other side of said combustion chamber, the valve seats of one of said plurality defining a substantially greater effective flow area than the valve seats of the other plurality, a plurality of poppet-type intake valves slidably supported by said cylinder head and controlling the flow through said intake valve seats, a plurality of poppet-type exhaust valves slidably supported by said cylinder head and cooperating with said exhaust valve seats for controlling the flow therethrough, actuating means for actuating said valves between their open and their closed positions, said actuating means being effective to cause non-symmetrical opening and closing of at least one of said valves so that it opens at a different rate than it closes, said actuating means comprising a camshaft rotatable about an axis and operating said valve through a thimble tappet, said different rate of opening and closing being achieved through profiles of a cam on said camshaft, said axis of rotation of said camshaft being offset from an axis of reciprocation of said tappet actuated thereby in a direction so that the side of said cam that effects the more rapid movement will contact the side of said tappet opposite to the direction of offset, said axis of reciprocation of said tappet being offset from the center of said cam so that said cam will effect rotation of said tappet in addition to reciprocation thereof.

2. An internal combustion engine as set forth in claim 1, wherein the actuating means causes a plurality of the valves to open and close at different rates.

3. An internal combustion engine as set forth in claim 1, wherein the actuating means causes the one valve to open at a slower rate and over a longer time period than it closes.

4. An internal combustion engine as set forth in claim 3, wherein the actuating means further causes another of the valves to open at a more rapid rate over a shorter duration than the rate and duration of closing.

5. An internal combustion engine as set forth in claim 1, wherein the plurality of valve seats having the greatest effective flow area comprises the intake valve seats and there are provided three intake valve seats and three poppet-type intake valves.

6. An internal combustion engine as set forth in claim 5, wherein the remaining plurality of valve seats comprise the exhaust valve seats and there are two such exhaust valve seats, each controlled by a respective poppet valve.

7. An internal combustion engine as set forth in claim 6, wherein the intake valve seats comprise a first pair of side intake valve seats disposed closest to a plane containing the cylinder bore axis and a third generally smaller intake valve seat disposed between said side intake valve seats and further from said plane than said side intake valve seats.

8. An internal combustion engine as set forth in claim 7, wherein the two exhaust valve seats have substantially the same effective flow area as each other, and the individual flow areas of the exhaust valve seats is less than the individual flow area of the side intake valve seats and greater than the effective flow area of the center intake valve seat.

9. An internal combustion engine as set forth in claim 8, wherein the actuating means effects rapid opening of all of the exhaust valves and during a shorter duration than the closing of the exhaust valves.

10. An internal combustion engine as set forth in claim 8, wherein the actuating means effects slower opening of all of the intake valves over a longer duration than their closing.

11. An internal combustion engine as set forth in claim 10, wherein the actuating means effects rapid opening of all of the exhaust valves and during a shorter duration than the closing of the exhaust valves.

12. An internal combustion engine as set forth in claim 1, wherein the actuating means comprises a pair of camshafts, each at which operates a respective one of the plurality of valves and which operates the plurality of valves directly.

13. An internal combustion engine as set forth in claim 12, wherein the direct action of the valves is through thimble tappets.

* * * * *